INVENTOR.
Robert L. Norton
BY
Brown and Mikulka
ATTORNEYS

United States Patent Office 3,430,547
Patented Mar. 4, 1969

3,430,547
PHOTOGRAPHIC SHUTTER MECHANISM
Robert L. Norton, Norfolk, Mass., assignor to Polaroid Corporation, Cambridge, Mass., a corporation of Delaware
Filed Apr. 26, 1966, Ser. No. 545,318
U.S. Cl. 95—60                 12 Claims
Int. Cl. G03b 9/26

This invention relates to a shutter mechanism for photographic cameras, and more particularly to a novel two-bladed shutter mechanism incorporating inertial means for retarding the shutter blades to lower the range of shutter speeds which would otherwise be effected by the mechanism.

Single-bladed shutters of the type wherein the shutter blade is eccentrically mounted on a pivoted member actuated by the shutter actuator have come into widespread use because of their simplicity, reliability, relatively low cost, constant shutter speed, and substantial independence of the shutter speed on actuation of the shutter actuator. In such single-bladed shutters, however, wherein a single blade both initiates and terminates exposure, the range of shutter speeds obtainable with precision tends to be limited, particularly at the longer exposure intervals. To provide for longer exposure intervals two-bladed shutters have been proposed in which one blade initiates exposure and another subsequently terminates exposure. Although two-bladed shutters lend themselves to more precise control of the longer shutter intervals, the mechanical and, sometimes, electrical controls associated with such shutters have substantially increased the complexity and therefore the cost of the exposure regulating structure. This invention contemplates the provision of a relatively uncomplicated two-bladed shutter mechanism combining some of the best features of single-bladed shutters including their reliability and rugged simplicity with the greater low-speed precision and larger exposure range of which two-bladed shutters are capable.

Accordingly, it is a primary object of this invention to provide a two-bladed shutter mechanism having inertial retarding means for prolonging the exposure interval.

It is another object of this invention to provide a two-bladed shutter mechanism which has variable speed capabilities and which is simple, reliable, and inexpensive to produce.

It is another object of this invention to provide a variable speed two-bladed shutter mechanism having a flywheel coupled between the opening and closing blades for retarding shutter speeds.

It is yet another object of this invention to provide a variable speed shutter mechanism in which the selected shutter speed is independent of the triggering action, and remains constant from exposure to exposure.

It is still another object of this invention to provide a shutter mechanism for a camera having speed-varying means which is responsive to the setting of variable diaphragm means defining the effective exposure aperture of the camera.

Briefly, one structural implementation of the inventive concept may take the form of a shutter mechanism mounted upon a base member having an exposure aperture therein. The shutter mechanism may include an actuating member pivotally mounted on the base member. An opening blade may be eccentrically mounted upon the actuating member. A closing blade may be eccentrically mounted upon the opening blade. Actuation of the shutter mechanism by an operator on the actuating member rotates the member until the opening blade escapes from first latch means disposed a fixed distance from the pivot axis of the member. Rotation of the opening blade to initiate exposure effects escape of the closing blade from second latch means located a predetermined radial distance from the pivot axis of the opening blade.

Control of the shutter speed may be accomplished by altering the said predetermined radial distance of the second latch means from the opening blade pivot axis. Alteration of the said radial distance may be coupled to variable diaphragm means for a camera with which the shutter mechanism is used, whereby the shuttter speed effected by the shutter mechanism is made to be a function of the effective exposure aperture.

Inertial retarding means may be incorporated in the shutter mechanism for lowering the attainable range of shutter speeds. The retarding means may take the form of a flywheel, for example, coupled between the opening and closing blades such that relative movement therebetween causes an acceleration of the retarding means and hence a retarding of the relative motion therebetween. The flywheel may be rotatably mounted on the opening blade and may have a gear means mating with gear means on the opening blade, whereby release of the opening blade to initiate exposure causes the retarding means to be accelerated in a first direction to retard the opening blade, and subsequent release of the closing blade to terminate exposure causes a deceleration of the retarding means and an acceleration thereof in the opposed direction to retard the closing blade.

Other objects of this invention will in part be obvious and will in part appear hereinafter.

The invention accordingly comprises the apparatus possessing the construction, combination of elements and arrangements of parts which are exemplified in the following detailed disclosure, and the scope of the application of which is indicated in the claims.

For a fuller understanding of the nature and objects of the invention, reference should be had to the following detailed description taken in connection with the accompanying drawing wherein.

Figure 1:
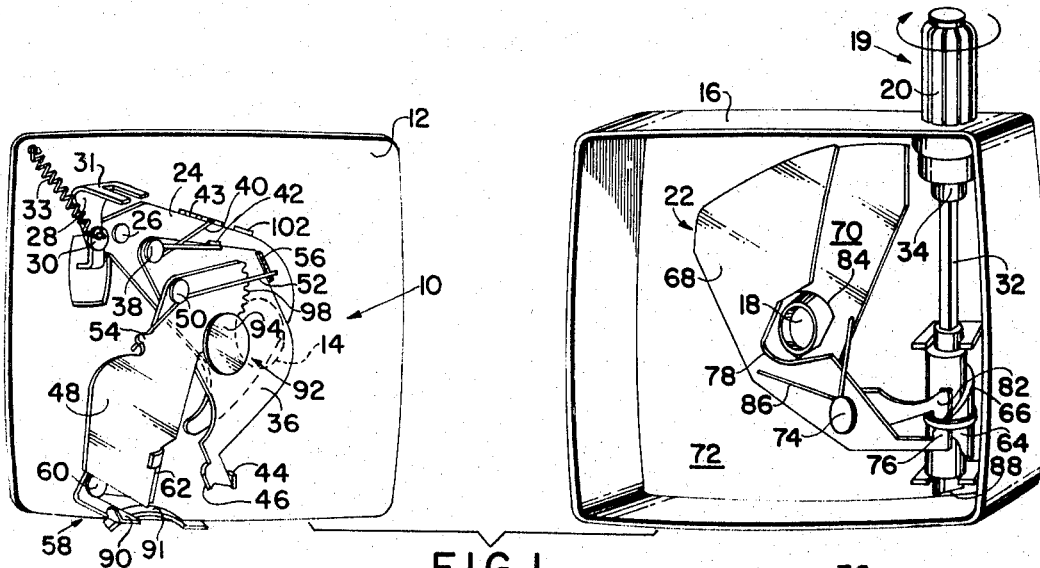
FIGURE 1 is a perspective view of a shutter mechanism shown detached from diaphragm means with which the shutter mechanism cooperates, the shutter mechanism being shown in its light-blocking position prior to exposure.

The drawing illustrates one of many possible shutter structures which may be constructed in accordance with the invention. A shutter mechanism 10 is shown mounted upon a base plate 12 having an exposure aperture 14 therein. The base plate 12 is affixed within a housing 16 constituting part of a front assembly of a camera with which the shutter mechanism may be used. The housing 16 contains an objective lens 18, an operator 19 for actuating the shutter mechanism 10 and variable diaphragm means 22 operated by rotation of the operator 19, as will be more fully explained below.

The shutter mechanism 10 includes an actuating member which may have only an actuating function or which may be designed to act also as a cover blind 24. The cover blind 24 is pivotally mounted on base plate 12 on a pin 26. The cover blind 24 is rotatable through a coupling member 28 pivotally mounted upon the cover blind 24 on a pin 30. The member 28 has a 90°-bent bifurcated end portion 31 which embraces a shaft 32 of rectangular cross-section mounting an operator button 20. A return spring 33 returns the shutter mechanism 10 to its rest position after exposure. A flange 34 on the shaft 32 engages the end portion 31 of member 28 when the operator button 20 is depressed to actuate the shutter mechanism 10.

In order that a plurality of selectable exposure speeds may be provided, the shutter mechanism 10 has a two-bladed arrangement for effecting exposure. An opening blade 36 is eccentrically mounted to rotate upon the cover blind 24 on a pin 38. A hairpin-type torsion spring 40 is wrapped around pin 38, having one end engaging a lug 42 upstanding from opening blade 36 and having the opposed end received in a selected slot of a tension-adjustment comb 43 integral with the cover blind 24. The spring 40 urges the opening blade 36 in the counterclockwise direction toward its light-unblocking position.

Prior to exposure the opening blade 36 is captured by latch means on the base plate 12 which may take form of a projection 44 extending therefrom perpendicular to the plane of the plate 12. A tail portion 46 on the rear edge of the opening blade 36 is angled outwardly from the plane of the opening blade 36 in order that as the blade 36 is returned after exposure to its rest position, the tail portion 46 will act as a ramp to lift the blade 36 over the projection 44 to allow recapture thereof by the projection 44.

In order to close the exposure aperture 14 after being exposed by release of the opening blade 36, a closing blade 48 is provided. The closing blade 48 is eccentrically mounted to pivot on the opening blade 36 on a pin 50. A hairpin-type torsion spring 52 has one end engaging a lug 54 on the closing blade 48 and the other end received in a selected slot in a tension-adjustment comb 56 extending perpendicularly from the opening blade 36. The tension in the spring 52 is such as to urge the closing blade 48 in the counterclockwise direction toward its light-blocking position.

It is evident that the exposure interval effected by the shutter mechanism 10 is a function of how quickly the closing blade 48 follows the opening blade 36 after the opening blade 36 has been released from the projection 44 to initiate exposure. In order to provide selectively variable shutter speeds, adjustable latch means 58 is provided for capturing the closing blade 48.

It is desirable in certain applications that the shutter speed, in addition to being variable, be made a function of the effective exposure aperture as defined by the diaphragm means 22. To accomplish this end, the shaft 32 mounts three axial cams. Two of the cams 64, 66, are symmetrically oriented on the shaft 32 for driving mating diaphragm blades 68, 70 pivotally mounted on a forward wall 72 of the housing 16 on a pin 74. Diaphragm blade 68 has a cam follower 76 driven by cam 64 and a recess 78 for partially defining the effective exposure aperture. Diaphragm blade 70 similarly has a cam follower 82 driven by cam 66 and a recess 84 cooperating with recess 78 in diaphragm blade 68 for defining the effective exposure aperture. A hairpin-type spring 86 biases the cam followers 76, 82 on diaphragm blades 68, 70 against cams 64, 66. It is evident that rotation of the trigger shaft 32 drives cam followers 76, 82 through cams 64, 66 to effect an adjustment of the effective exposure apertured defined by recesses 78, 84 in blades 68, 70.

So that the shutter speed may also be selectively coordinated with the effective exposure aperture as defined by the diaphragm means 22, a third axial cam 88 is disposed on the end of the shaft 32 in a position which coincides with the location of a transverse extension 90 of the latch means 58. As the operation button 20 (and hence the shaft 32) is rotated, the axial cam 88 will operate on the transverse extension 90 of the latch means 58 against the bias of a leaf spring 91 to cause the latch means 58 to rotate so as to alter the position of the arm 62 which captures the closing blade 48. Thus, the release of the closing blade 48 is, and hence the shutter speed, a function of the effective exposure aperture.

Figure 2:
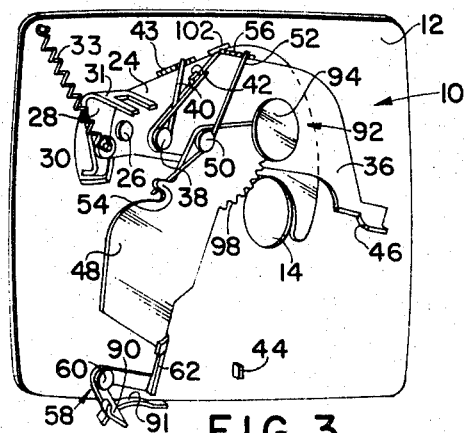
FIG. 2 is an enlarged fragmentary view of a portion of the shutter mechanism illustrated in FIGURE 1, a part of the view being broken away to reveal concealed elements.

For certain photographic applications, for example, where color or other lower speed films are to be used in the camera with which the shutter mechanism is associated, it is desirable that slower shutter speeds be provided. Referring especially to FIG. 2, inertial retarding means 92 are provided to accomplish this end. The inertial retarding means 92 comprises a flywheel 94 rotatably mounted on the opening blade 36 on a flywheel shaft 96. Closing blade 48 is provided with an arcuate set of gear teeth 98 which mesh with a spur gear 100 non-rotatably mounted on the flywheel shaft 96.

As more fully described below in connection with the operation of the shutter mechanism 10, release of the opening blade 36 causes the spur gear 100 to follow the gear teeth 98 in the counterclockwise direction, accelerating the flywheel 94 in the counterclockwise direction. This has a retarding effect on the opening blade 36. Subsequent release of the closing blade 48 causes the spur gear 100 to move, relative to the closing blade 48, in the clockwise direction. The flywheel 94 is thus caused to decelerate and accelerate in the clockwise direction, retarding the closing blade.

To actuate the shutter mechanism, operator button 20 is depressed, causing the coupling member 28 to be moved downwardly. Downward movement of the member 28 against the tension of return spring 33 pivots the cover blind 24 in a counterclockwise direction through an arcuate displacement sufficient to uncover the exposure aperture 14 in base plate 12.

Figure 3:
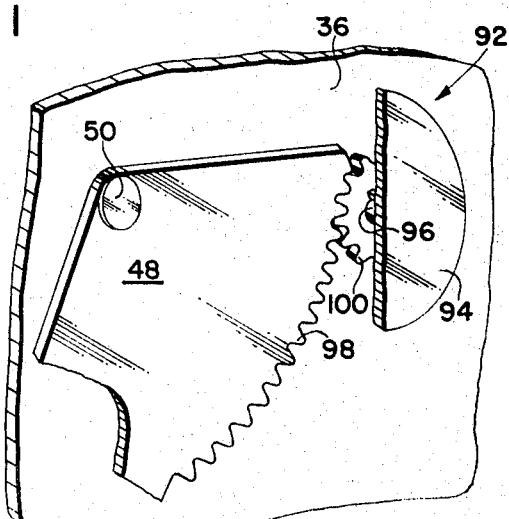
FIG. 3 is a perspective view of the shutter mechanism illustrated in FIGS. 1 and 2, the mechanism being shown in its light-unblocking position during exposure.

As the cover blind 24 is rotated in the counterclockwise direction, the pivot axis of the opening blade 36 on the cover blind 24 is displaced away from the projection 44 capturing the opening blade 36. At some point determined by the geometry of the elements of the shutter mechanism 10 and the radial distance of the projection 44 from the pivot axis of the cover blind 24, the opening blade escapes from projection 44. The spring 40 urges the opening blade 36 in the counterclockwise direction, effecting a relative movement between the opening blade 36 and the closing blade 48. The relative movement between the blades 36, 48, causes the flywheel 94 to be accelerated in the counterclockwise direction as the spur gear 100 traverses the gear teeth 98 on closing blade 48. The acceleration of the flywheel 94 has an inertial retarding effect on the speed of opening blade 36 as it moves to initiate exposure. The opening blade 36 is stopped by a lug 102 on the cover blind 24. FIG. 3 shows the exposure aperture 14 fully exposed by the opening blade 36.

As the opening blade 36 rotates in the counterclockwise direction, the pivot axis of the closing blade 48, carried upon opening blade 36, is displaced away from the transverse extension 90 of latch means 58 capturing the closing blade 48. At some predetermined point during the travel of opening blade 36, the closing blade 48 escapes from the latch means 58. The closing blade 48, under the influence of spring 52, moves in a counterclockwise direction to follow the opening blade 36 toward its exposure-terminating position.

At the instant preceding release of the closing blade 48, flywheel 94 is being accelerated in the counterclockwise direction by the release movement between opening blade 36 and closing blade 48 as the opening blade 36 moves to initiate exposure. At some instant briefly after the closing blade 48 is released from latch means 58, the direction of relative movement between the opening blade 36 and the closing blade 48 reverses as the closing blade 48 rotates in the counterclockwise direction toward its light-blocking position. At the instant the closing blade 48 is released, the direction of relative movement between the opening and closing blades 36, 48, begins to reverse. The counterclockwise angular momentum in the flywheel 94 is transmitted to the closing blade 48, effecting a retardation thereof. The flywheel 94 is thereafter accelerated in the clockwise direction by the relative movement (in the reversed direction) between the closing blade 48 and the opening blade 36, further retarding the closing blade 48. See FIG. 4 wherein the closing blade 48 is shown in its light-blocking position subsequent to exposure.

Thus the flywheel 94 has a three-fold lengthening effect on the exposure interval: (1) by retarding the speed of the opening blade 36, (2) by transmitting the momentum generated during the opening phase to the closing blade 48, and (3) by retarding the speed of the closing blade 48.

Satisfactory working models have been constructed of the shutter mechanism wherein the use of a flywheel has caused a two fold reduction in the shutter speed, for example, from one hundredth of a second to one fiftieth of a second. It is manifest that a wide range of exposure speeds may be achieved by varying the mass of the flywheel, or by altering numerous other design factors.

Figure 4:
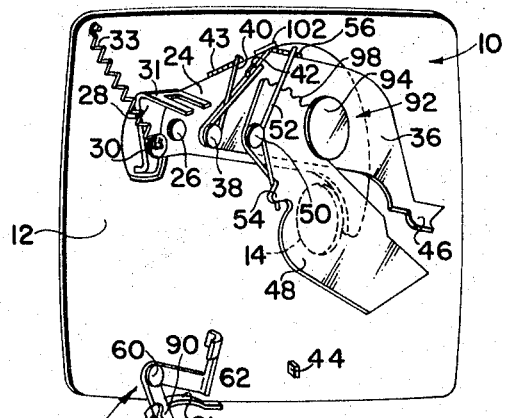
FIG. 4 is a perspective view of the shutter mechanism illustrated in FIGS. 1–3, the mechanism being shown in its light-blocking position after exposure.

After the closing blade 48 has moved to the light-blocking position to terminate exposure as shown in FIG. 4 and the operator button 20 is released by the operator, the return spring 33 rotates the cover blind 24, opening blade 36, and closing blade 48 as a unit in the clockwise direction to the rest position thereof. Tail portion 46 of the opening blade 36 lifts the opening blade 36 over the projection 44 to allow recapture of the opening blade 36 by the projection 44.

As explained above, the exposure interval may be controlled in co-ordination with control of the effective exposure aperture by means of cam 88 operating on the transverse extension 90 on latch means 58. In the particular configuration shown, the axial cam 88 is disposed so as to decrease the shutter speed as the effective exposure aperture is decreased. This will become evident from the fact that the operator button 20 (and shaft 32) is rotated in the clockwise direction, as indicated by the arrow in FIGURE 1, the diaphragm blades 68, 70 close the effective exposure aperture, and the cam 88 operating on extension 90 increases the radial displacement of the arm 62 on latch means 58 away from the pivot axis of cover blind 24. Increasing the radial separation of arm 62 from the cover blind pivot axis allows the closing blade 48 to follow the opening blade 36 after a shorter angular displacement of the opening blade 36 than would be the case if the arm 62 was located on a shorter radius to the cover blind pivot axis.

By an appropriate design of the cam 88 and latch means 58, the closing blade 48 can be caused to follow the opening blade 36 immediately after release of the opening blade 36 to effect a very short exposure interval, or the closing blade 48 can be caused to be released from the latch means 58 at some point very near the extreme of the locus of travel of the opening blade 36, thus effecting a relatively long exposure interval.

Since certain other changes may be made in the above apparatus without departing from the scope of the invention herein involved, it is intended that all matter contained in the above description or shown in the accompanying drawings shall be interpreted as illustrative and not in a limiting sense.

What is claimed is:

1. A shutter mechanism for photographic apparatus comprising:
    means defining an exposure aperture;
    an opening blade normally blocking the exposure aperture, said opening blade being mounted to pivot on a first pivot axis to unblock the exposure aperture to initiate exposure;
    a closing blade normally unblocking the exposure aperture, said closing blade being mounted to pivot on said opening blade on a second pivot axis spaced from said first pivot axis to close the exposure aperture to terminate exposure;
    spring means for biasing said opening blade toward a light unblocking position and for biasing said closing blade toward a light blocking position;
    first latch means for retentively engaging said opening blade;
    second latch means for retentively engaging said closing blade at a predetermined radial distance from said first pivot axis; and
    an actuating member mounting said opening blade and being mounted on the base member to pivot on a third pivot axis distinct from said first and second pivot axes from a normally closed position over the exposure aperture to a position unblocking the exposure aperture during the exposure interval, whereby rotation of said actuating member to actuate the shutter mechanism draws said opening blade free of said first latch means to initiate exposure and rotation of said opening blade through a predetermined angular displacement draws said closing blade free of said second latch means to terminate exposure.

2. The invention defined by claim 1 wherein said second latch means includes variable means for varying said radial distance to control the exposure interval effected by said shutter mechanism by controlling the time differential between the release of said opening blade and the release of said closing blade.

3. A shutter mechanism for photographic apparatus, comprising:
    means defining an exposure aperture;
    an opening blade normally blocking the exposure aperture, said opening blade being mounted to pivot on a first pivot axis to unblock the exposure aperture to initiate exposure;
    a closing blade normally unblocking the exposure aperture, said closing blade being mounted to pivot on said opening blade on a second pivot axis spaced from said first pivot axis to close the exposure aperture to terminate exposure;
    spring means for biasing said opening blade toward a light unblocking position and for biasing said closing blade toward a light blocking position;
    first latch means for retentively engaging said opening blade;
    means for effecting disengagement of said first latch means from said opening blade to initiate exposure;
    second latch means for retentively engaging said closing blade at a predetermined radial distance from said first pivot axis, said second latch means releasing said closing blade after said opening blade has been released and has rotated through a predetermined angular displacement; and
    inertial retarding means for prolonging the interval between initiation and termination of exposure coupled between said opening blade and said closing blade so as to be accelerated by relative movement therebetween, whereby said retarding means is accelerated in one direction to retard said opening blade when said opening blade is released to move in a first direction relative to said closing blade, and whereby said retarding means is decelerated and accelerated in the opposed direction to retard said closing blade and when said closing blade is released to move in the opposed direction relative to said opening blade.

4. The apparatus defined by claim 3 wherein said shutter mechanism includes an actuating member mounting said opening blade, said actuating member being mounted on said means defining said exposure aperture to pivot on a third pivot axis distinct from said first and second pivot axes, rotation of said member to actuate the shutter mechanism drawing said opening blade free of said first latch means to initiate exposure and rotation of said opening blade drawing said closing blade free of said second latch means to terminate exposure.

5. The apparatus defined by claim 4 wherein said spring means comprises a first torsion spring operating between said actuating member and said opening blade and a second torsion spring operating between said opening blade and said closing blade.

6. The apparatus defined by claim 5 wherein said second latch means includes variable means for varying said radial distance to control the exposure interval effected by said shutter mechanism by controlling the time differential between the release of said opening blade and the release of said closing blade.

7. A photographic shutter mechanism comprising:
mounting means having an exposure aperture associated therewith;
an actuating member movable with respect to said mounting means;
an opening shutter blade mounted pivotally on said actuating member for movement of its pivotal axis by movement of said actuating member;
first resilient biasing means urging said opening blade toward a position uncovering said exposure aperture;
first latch means engaging a portion of said opening shutter blade in a blocking position with respect to said aperture, the pivotal axis of said opening blade being movable by said actuating member in a direction away from said first latch means to trip said opening blade;
a closing shutter blade pivotally mounted on said opening blade with a pivotal axis displaced from that of said opening blade;
second resilient biasing means urging said closing blade toward a position blocking said exposure aperture;
second latch means engaging a portion of said closing shutter blade in an unblocking position with respect to said aperture, the pivotal axis of said closing blade being movable in a direction away from said second latch means when said opening blade trips thereby to trip said closing blade;
a flywheel rotatably mounted on one of said blades;
means responsive to relative movements between said shutter blades for accelerating said flywheel in one direction when said opening blade is tripped and then in the opposite direction when said closing blade is tripped to prolong the interval between initiation and termination of exposure through said aperture; and
means mounting said second latch means for selective positioning to vary the release point of said closing blade thereby to vary the exposure interval.

8. A shutter mechanism for photographic apparatus, comprising:
means defining an exposure aperture;
variable diaphragm means registered with said exposure aperture for defining a selected effective exposure aperture; and
a shutter mechanism comprising:
an opening blade normally blocking said exposure aperture, said opening blade being mounted to pivot on a first pivot axis to unblock said exposure aperture to initiate exposure,
a closing blade normally unblocking said exposure aperture, said closing blade being mounted to pivot on said opening blade on a second pivot axis spaced from said first pivot axis to close said exposure aperture to terminate exposure,
spring means for biasing said opening blade toward a light unblocking position and for biasing said closing blade toward a light blocking position,
first latch means for retentively engaging said opening blade,
means for effecting disengagement of said latch means from said opening blade to initiate exposure, and
second variable latch means responsive to variations in the effective exposure aperture defined by said diaphragm means for retentively engaging said closing blade at a radial distance from said first pivot axis dependent on the setting of said diaphragm means, said second latch means releasing said closing blade after said opening blade has been released and has rotated through an angular displacement dependent on said radial distance, whereby the exposure interval effected by said shutter mechanism is dependent upon the effective exposure aperture defined by said diaphragm means.

9. The apparatus defined by claim 8 including inertial retarding means for prolonging the interval between initiation and termination of exposure coupled between said opening blade and said closing blade so as to be accelerated by relative movement therebetween, whereby said retarding means is accelerated in one direction to retard said opening blade when said opening blade is released to move in a first direction relative to said closing blade, and whereby said retarding means is decelerated and accelerated in the opposed direction to retard said closing blade when said closing blade is released to move in the opposed direction relative to said opening blade.

10. A shutter mechanism for photographic apparatus, comprising:
a mounting member having an exposure aperture therein;
variable diaphragm means registered with said exposure aperture for defining a selected effective exposure aperture;
operator means for actuating said diaphragm means to vary the effective exposure aperture, said operator means including cam means; and
a shutter mechanism comprising:
an opening blade normally blocking said exposure aperture, said opening blade being mounted to pivot on a first pivot axis to unblock said exposure aperture to initiate exposure;
a closing blade normally unblocking said exposure aperture, said closing blade being mounted to pivot on said opening blade on a second pivot axis spaced from said first pivot axis to close said exposure aperture to terminate exposure, and
cover blind means mounted to pivot on said mounting member on a third pivot axis displaced from said first and second pivot axes from a normally closed position over the exposure aperture to a position unblocking the exposure aperture during the exposure interval, said cover blind means mounting said opening blade;
a first torsion spring operating between said cover blind means and said opening blade for biasing said closing blade toward a light unblocking position;
second spring means operating between said opening blade and said closing blade for biasing said closing blade toward a light blocking position;
first latch means for retentively engaging said opening blade; and
second variable latch means responsive to said cam means for retentively engaging said closing blade at a radial distance from said first pivot axis determined by said cam means, rotation of said cover blind means to actuate the shutter mechanism drawing said opening blade free of said first latch means to initiate exposure and rotation of said opening blade drawing said closing blade free of said second latch means to terminate exposure after said opening blade has rotated after release thereof through an angular displacement dependent on said radial distance, whereby the exposure interval effected by said shutter mechanism is dependent upon the effective exposure aperture defined by said diaphragm means.

11. The apparatus defined by claim 10 including inertial retarding means for prolonging the interval between initiation and termination of exposure coupled between said opening blade and said closing blade so as to be accelerated by relative movement therebetween, whereby said retarding means is accelerated in one direction to retard said opening blade when said opening blade is released to move in a first direction relative to said closing blade, and whereby said retarding means is decelerated and accelerated in the opposed direction to retard said closing blade when said closing blade is released to move in the opposed direction relative to said opening blade.

12. The apparatus defined by claim 11 wherein said closing blade includes gear means and wherein said inertial retarding means comprises a flywheel mounted to rotate on said opening blade, said flywheel having gear means driven by said gear means on said closing blade.

References Cited

UNITED STATES PATENTS 2,731,895   1/1956   McKee _____ 95—60

JOHN M. HORAN, *Primary Examiner.*